358-69. OR 3,748,375 SR

T 6532

United States Patent [19]

Sunstein

[11] 3,748,375

[45] July 24, 1973

[54] TELEVISION IMAGE-DISPLAY SYSTEM

[76] Inventor: David E. Sunstein, 464 Conshohocken State Rd., Bala-Cynwyd, Pa. 19004

[22] Filed: Oct. 8, 1971

[21] Appl. No.: 187,741

[52] U.S. Cl. .............................................. 178/5.4 F
[51] Int. Cl. .............................................. H04n 9/24
[58] Field of Search ...................... 178/5.4 R, 5.4 F, 178/5.4 H

[56] References Cited

UNITED STATES PATENTS

| | | | |
|---|---|---|---|
| 2,863,937 | 12/1958 | Kalfaian | 178/5.4 F |
| 2,677,723 | 5/1954 | McCoy et al. | 178/5.4 R |
| 3,305,628 | 2/1967 | Kitamura | 178/5.4 F |
| 2,967,210 | 1/1961 | Kell | 178/5.4 F |
| 3,098,896 | 7/1963 | Lynch et al. | 178/5.4 F |
| 3,207,945 | 9/1965 | Goodman | 178/5.4 F |
| 3,234,324 | 2/1966 | Mutschler | 178/5.4 F |

*Primary Examiner*—Richard Murray
*Attorney*—Dexter N. Shaw, Albert L. Free et al.

[57] ABSTRACT

In a color television image-display system of the type utilizing a screen comprising triplets of vertical phosphor stripes across which the cathode-ray beam is scanned with an intensity controlled by the color television signal to form the color image, and in which index elements are arranged in predetermined geometric configuration with respect to the triplets to provide index signals indicative of beam position, an additional beam-intensity varying signal is applied to the tube in such frequency and phase that the beam intensity is reduced by the additional signal whenever the beam is centered midway between successive color phosphor stripes. In one embodiment, the stripes are spaced apart from each other and the spaces are occupied by a black material producing negligible light emission in response to beam impingement. In such case, beam current is normally wasted during impingement of the spaces between stripes, and the additional signal utilized in accordance with the invention to reduce the beam intensity at such times results in a net saving in beam current. In another preferred form, the stripes are contiguous or nearly so, and the additional signal reduces the beam intensity on, and adjacent, the lines between successive stripes so as to minimize "cross talk" between stripes. The additional signal for this purpose is preferably derived from the indexing signal by appropriate frequency multiplication and phasing.

10 Claims, 5 Drawing Figures

TELEVISION IMAGE-DISPLAY SYSTEM

BACKGROUND OF THE INVENTION

This invention relates to improvements in television image-display systems, especially color television image-display systems, in which the image is displayed on a cathode-ray tube screen having groups of controllable light-influencing elements thereon across which the beam is scanned with a controlled intensity, and particularly wherein the cathode-ray tube also includes index elements, in predetermined geometric configuration with respect to the light-influencing elements, which respond to impingement by the beam to produce index signals representative of the beam position.

Color television image-display systems are known in the prior art in which the image is produced on an image-forming screen in a cathode-ray tube, the screen of the cathode-ray tube comprising a plurality of similar groups of light-emissive elements disposed beside each other across the screen, adjacent elements in each of these groups responding to impingement by the beam to produce light of a corresponding different color; for example, vertical stripes of phosphors producing light of different colors in response to beam impingement may be utilized, each group consisting of a red, a green, and a blue light-producing phosphor stripe. The cathode-ray tube includes means for forming a cathode-ray beam and for scanning it across the screen means and across the light-emissive elements, as well as beam-intensity controlling means responsive to an applied color television signal for controlling the intensity of the beam as it scans across the phosphor stripes so that the desired color image is formed.

In order effectively to synchronize the beam-intensity variations with the scanning of the light-emissive elements as required to form the color image, it is also known to utilize indexing elements in the cathode-ray tube which are arranged in a predetermined configuration or pattern with respect to the light-emission stripes, and which respond to impingement by the beam to produce indexing signals indicative of beam position. These indexing signals are then utilized to effect the above-mentioned synchronization or control of the timing of the applied color television signals so that the beam will assume the proper intensity when passing over a given light-emissive element. In a preferred form of such image-display system, the index elements are so positioned that they are scanned by the beam at a rate which is an odd integral multiple, greater than one, times one-half the rate at which the color groups or triplets are scanned by the beam.

Such systems are described and claimed, for example, in my U.S. Pat. No. 3,013,113, issued Dec. 12, 1961; my U.S. Pat. No. 2,892,123, issued June 23, 1959; and my U.S. Pat. No. 3,305,788, issued Feb. 21, 1967.

In such a cathode-ray tube it is possible to form the screen by locating each light-emissive element contiguous its neighbors, i.e. touching or nearly touching them. However, it is difficult to make such a screen structure without contaminating one light-emissive element by the material of the other, for example without causing some inter-mixing between the red and green phosphors of adjacent stripes. Furthermore, since the color television signal most economically has a chroma-representing component of sinusoidal, and hence gradually varying, form which exactly represents the desired degree of actuation of each successive color stripe only at successive time-spaced points therein, even if the contiguous light-emissive elements were perfectly formed there would be a tendency for undesired "cross talk" of color rendition due to the finite duration of the chroma signal and due to the effect of the finite width of the cathode-ray beam when it scans across the boundary between the contiguous light-emissive elements. In addition, with sinusoidal chroma drive for the grid of the cathode-ray tube, any small error in timing of the index phase relative to the time the beam sweeps past the boundary between color stripes will produce color errors, particularly when reproducing colors which are complements, i.e. the sum of two adjacent primary colors. Such small errors can arise from an error of as little as 0.002 inch in the location of a color stripe relative to its neighbor or relative to the index stripe pattern.

It is also known to leave spaces between successive light-emissive elements, which spaces are preferably wider than the cathode-ray beam spot-width, so that contamination between the materials of adjacent light-emissive elements is avoided during manufacture, as is cross talk between adjacent stripes produced by normal operation, even with sinusoidal grid drive waveforms. Such spans between the light-emissive elements are such as to produce negligible light emission in response to beam impingement, and it is also known to be desirable in some cases to fill these spaces with a material which itself appears black, to enhance the general appearance of the color image. These expedients, and their advantages and techniques for providing them, being now well-known in the art, it will be unnecessary to describe them further. It is noted however, that the use of such separations, even if black, still does not eliminate the color error when reproducing complementary colors as above described, when using a chroma drive which is sinusoidal at triplet frequency, and when a small error exists in the location of a color stripe relative to the location of the index stripe pattern.

It is therefore an object of the invention to provide a new and improved television image-display system.

Another object is to provide such a system having spaces between successive light-influencing elements, in which system the average cathode-ray beam current is reduced with a resultant decrease in the complexity and expense of the cathode-ray tube and its current supplies.

Another object is to provide an improved color television image-display system in which the light-emissive elements in the cathode-ray tube screen which produce the different colors of light in response to beam impingement are contiguous each other, and in which color rendition is improved despite possible cross-contamination between the materials of adjacent light-emissive elements and cross-talk due to electrical characteristics of the system.

It is another object of the invention to reduce or eliminate small errors in reproduced color in an index cathode-ray tube which uses sinusoidal or narrow-band chroma drive and which therefore, without the use of the invention, would create such color errors in the reproduced image, particularly on complements, and particularly in regions of the picture (a) where the color lines are not of uniformly correct width, or (b) where the color lines are not placed precisely in proper geometric relationship to the index stripe locations, or (c) where the sweep speed changes from its nominal value sufficiently to cause an error in the phase of the index signal, due to imperfect compensation of index phase errors with changes of sweep speed.

A further object is to provide each of the foregoing improvements in a reliable, inexpensive and simple manner.

SUMMARY OF THE INVENTION

These and other objects of the invention are realized by the provision, in the general type of system described hereinbefore, of means for generating an additional signal having a frequency substantially equal to the rate at which the light-influencing elements of the tube are scanned by the beam and means for using said additional signal to reduce the intensity of the beam each time the beam is substantially centered midway between adjacent ones of said elements. For example, the additional signal is preferably substantially sinusoidal in form, with a frequency equal to the frequency at which the cathode-ray beam scans across the light-influencing elements, such as the color stripes of a color television display tube.

In one preferred form of the invention, using a color television display tube of the type using adjacent groups of phosphor stripes emissive of light of different colors, the light-emissive elements are substantially contiguous, and the reduction of beam intensity is produced along the line between the light-emissive elements not only to reduce the average cathode-ray beam current required during operation, but also to minimize the light emission from the screen at times when material contamination or electrical cross-talk tends to occur, thus greatly reducing or substantially eliminating unfaithful color reproduction which tends to occur at such times. In another preferred embodiment in which the light-emissive elements are spaced apart from each other, the additional signal causes the beam intensity to be reduced to its maximum extent while it is scanning the spaces between light-emissive elements, thereby taking advantage of the fact that no beam current is required while scanning such spaces, as a means of reducing the average cathode-ray beam current. Preferably these spaces between the light-emissive elements are occupied by a material which produces negligible light emission in response to beam impingement, and in a preferred form it is itself a material which appears black to the eye, so that no interfering light is produced during the scanning of the regions between light-emissive elements and the appearance of the color image is enhanced.

BRIEF DESCRIPTION OF FIGURES

Other objects and features of the invention will be more readily understood from a consideration of the following detailed description, taken in connection with the accompanying drawings, in which.

Figure 1A:
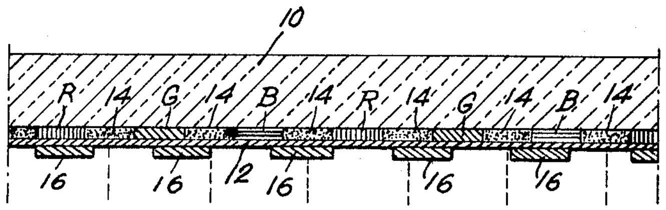
FIG. 1A is a diagrammatic sectional view of a portion of a cathode-ray tube screen means to which the invention is applicable.

Referring first to the screen means of FIG. 1A by way of example only, this screen means may be similar in its form and general arrangement to that shown, for example, in FIG. 1 of my above-cited U.S. Pat. No. 3,013,113, with the principal exception that the screen means of FIG. 1A is provided with substantial spaces between successive light-emissive elements which are filled with a black material producing little or no light emission in response to beam impingement, and in that the widths of the index elements are longer compared to the widths of the light-emissive elements in the direction of scanning by the beam, than in my cited patent.

More particularly, the transparent front glass face plate 10 of the color-image display cathode-ray tube is provided on its inner surface with the spaced-apart, vertically extending, light-emissive phosphor stripes labeled R, G, B, two successive triplets of red, green and blue phosphor stripes being shown. It is understood that the cathode-ray beam scans across the lower surface of the phosphor stripes as depicted in FIG. 1A, for example from left to right in the figure. A thin aluminium layer 12 preferably covers the inner side of the light-emissive phosphor stripes to prevent light from the phosphor stripes from propagating into the interior of the tube, aluminium layer 12 being however pervious to the cathode-ray beam so as to permit the beam to reach the phosphor stripes and cause them to emit light forwardly through plate 12 as each stripe is impinged by the beam.

The stripes R, G, B are spaced from each other along the direction of beam scanning and the spaces between them filled with stripes 14 of a material which, because of their non-responsiveness to impingement by the beam and their dark appearance, will be referred to hereinafter as "black" stripes. Across the rear face of the aluminium layer 12 are located the index elements or stripes 16, which respond to impingement by the cathode-ray beam to produce the index signal. In this example, it may be assumed that each index stripe is of a type which emits light in response to impingement by the beam, and as will be described later hereinafter, a photo-sensitive device is utilized to detect the times at which the index elements produce bursts of light in response to scanning by the beam, in order to form the index signal. In this example the index elements 16 are spaced apart so as to be scanned at a rate which is 5/2 times the rate at which the triplets of colored-light emissive phosphors are scanned by the beam. Also in this example, the widths of the phosphor stripes are all equal in the direction of scanning by the beam, and the black stripes 14 between the phosphor stripes are of the same widths as the phosphor stripes; furthermore, in this example the index stripes 16 are somewhat wider than the spaces between successive colored-light emissive stripes, for reasons which will become more apparent hereinafter.

Figure 1B:
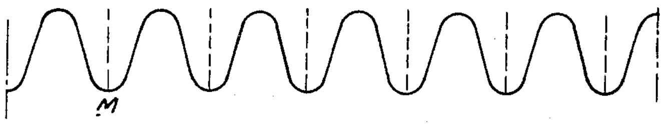
FIG. 1B is a waveform illustrating the variation of one form for the additional signal supplied in accordance with the invention, illustrating its preferred time relation with respect to the scanning of the screen means of FIG. 1A.

FIG. 1B illustrates the general manner in which the beam intensity may be varied by the additional signal supplied to the beam-intensity controlling means of the cathode-ray tube in accordance with the invention. In this example it is assumed that the minima, our most negative values, of the waveform are those which reduce the beam intensity to the maximum extent, as will be the case if a signal of the waveform shown is applied to the grid of the cathode-ray tube. Such minima, as shown at M of FIG. 1B, are preferably caused to occur at the center of each of the black stripes 14, and preferably are sufficient in magnitude to cut off the cathode-ray beam, or at least greatly reduce its intensity, at such times. While the beam is scanning the light-emissive phosphor stripes, it is permitted to be turned on and to be controlled by the color television signal so as to produce the degree of light emission desired from each of the stripes. Since the additional signal shown in FIG. 1B is of constant amplitude, it does not affect materially the relative magnitudes of light from differently colored phosphors, and therefore it does not affect the color rendition, particularly when producing primary colors; in fact, as described later, it will improve the accuracy of color rendition when producing complementary colors. Nevertheless, since the beam intensity is reduced greatly during the spaces between adjacent light-emissive elements, i.e. on the black stripes, the average cathode-ray beam current is substantially reduced. This reduces the average current requirements for the cathode-ray tube current supply, and, importantly, reduces the average current required from the final-anode high-voltage supply and thereby enables the use of a simpler and less expensive high-voltage supply.

Figure 2:
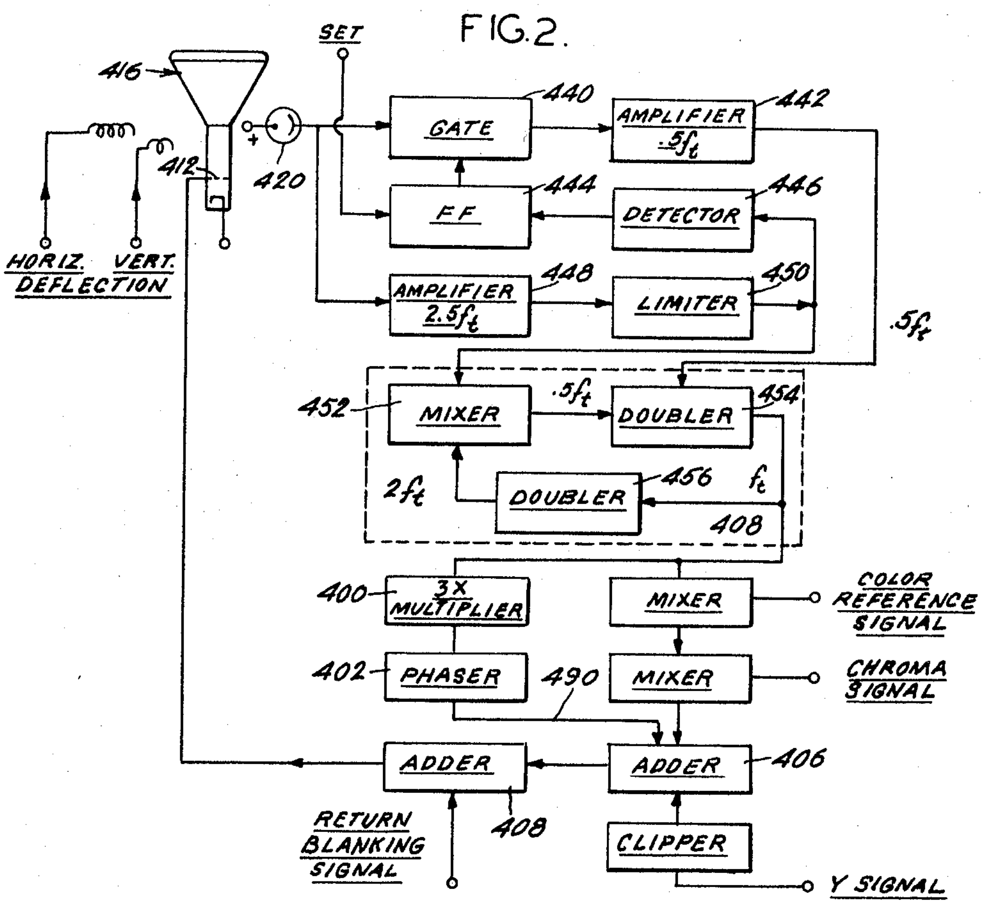
FIG. 2 is a block diagram of a color television receiver and image-display system embodying the invention.

FIG. 2 illustrates one form of color television receiver system in which the invention may be employed, including an illustration of a preferred manner of deriving the additional signal used to control the beam intensity in accordance with the invention in one aspect. FIG. 2 is a substantial replica of FIG. 8 of my above-cited U.S. Pat. No. 3,013,113, with the exception of the addition of the block 400 representing a multiplier effective to multiply the frequency of input signal thereto, by a factor of 3, and a phaser block 402 through which the resultant signal is applied to the adder 406. The input to the multiplier 400 is taken from the line 408 on which there are produced index signals comprising substantially sinusoidal variations at the frequency $f_t$ at which the triplets of differently-colored light-emissive stripes are scanned by the cathode-ray beam. Since there are three color stripes per triplet, the output of the frequency multiplier 400 varies at a frequency equal to the frequency at which the individual color phosphor stripes 14 are scanned by the beam. The phaser 402 is adjusted so that, when the signal therefrom is supplied to the adder 406 and thence through the subsequent adder 408 to the grid 412 of the color television image-display cathode-ray tube 416, the component of the signal on the grid 412 due to the additional signal thus produced will have the polarity and phase relation illustrated in FIG. 1B, thereby to produce operation in accordance with the invention. Thus the desired additional signal is obtained merely by multiplying the frequency of an existing index signal and appropriately phasing it to produce the desired operation.

The various elements of the system shown in FIG. 2 are described in detail, and their operations fully set forth, in my above-cited Patent 3,013,113, and this description is included herein by reference and need not be reproduced herein. In brief, the photo-sensitive device 420 views the rear side of the index elements through a suitable window in the cathode-ray tube 416, thereby to produce a so-called "ambiguous" running index signal varying at the rate at which the index stripes are scanned by the beam, e.g. in this case at a frequency of $5/2\ f_t$. In this embodiment, the cathode-ray tube also includes certain starting stripes which are scanned by the beam to produce starting signals, and the ambiguous running index signals and the starting index signals are used to produce an unambiguous index signal of frequency $f_t$ on line 408 by means of the gate 440, the amplifier 442, the flip-flow 444, the detector 446, the further amplifier 448, the limiter 450, the mixer 452, the doubler 454, the further doubler 456, and the appropriate inter-connections and supply voltages, all as fully described in my above-cited U.S. Patent.

Accordingly, the structure and operation of the invention are obtained merely by the addition to the preexisting system of the multiplier 400 and the phaser 402, although it be understood that the phaser or multiplier or both may also include any necessary amplifiers for producing the desired amplitude of the additional signal, and in some cases a suitable gain control for permitting adjustment of this amplitude; and, if desired, phaser 402 can be used ahead of the frequency tripler 400, so that it need have a three times smaller range of phase shift at frequency $f_t$ to achieve a given phase shift at $3\ f_t$ than when installed as shown in the drawing. Of course, if the loop phasing is designed carefully, no adjustable phase shifter 402 need be used at all, and of course small adjustments to phasing of the signal fed into line 490 can be achieved by tuning of any tuned circuits at the input or output of the frequency tripler 400, thereby in any event achieving a phasing adjustment, without significant change of amplitude of drive on line 490, provided the tuning adjustment is not dragged far off resonance. A simple way of adjusting the phaser is to adjust it to produce brightest picture on a primary color, or on a monochrome signal.

Preferably, and so that the relative phases of the two inputs to adder 406 will not be affected by variations in the beam scanning speed, the time delay from line 408 to adder 406 is the same by way of the path through 400 and 402 as it is by way of the parallel path through the two mixers in the figure.

As an example only, when the triplet scanning rate is 7 megaherz, the additional signal on line 490 preferably has a frequency of 21 megaherz.

Referring again to FIGS. 1A and 1B, it will be noted that the index stripes in some cases at least partially cover the "black" stripes 14, so that the beam intensity is reduced markedly while striking some of the index stripes. However, since the index stripes are wider than the black stripes, and since the relative positions of the color stripes compared to the index stripes varies progressively across the screen, there is always some index signal produced by each stripe and in any event there will not be more than a few index stripes for which the index signal remains low. The resultant composite index signal is sufficient to operate the index circuits in the image-display system under these circumstances, particularly in view of the built-in memory which such circuits typically have.

While FIG. 1B shows a substantially sinusoidal variation in the additional beam-controlling signal, it will be understood that, when such a sinusoidal additional signal is applied to the grid of the cathode-ray tube in sufficient amplitude the cathode-ray tube can be made to become cut off completely for substantially a complete half-cycle, and if desired the waveform of the additional signal may be non-sinusoidal (e.g. more nearly rectangular) with some advantage in performance but some increase in complexity because of the higher frequency components and greater circuit bandwidth then required. Also, the sinusoidal signal may be used to operate a gate through which the signals are applied to the cathode-ray tube grid to close it during scanning of the spaces between phosphor stripes, which in effect again supplies the additional signal to the grid and is similar to applying the sinusoid directly to the grid. The additional signal need not be applied to the grid in any case, and for example may be applied in the opposite phase to the cathode-ray tube cathode.

In variants of the system described above, the additional signal may be derived from other points in the system. For example, in a system in which the index signals are spaced across the screen so as to be scanned by the beam at 3/2 the rate at which color triplets are scanned, the ambiguous running index signal derived directly from the photo-sensitive device will be at 3/2 the triplet rate, and this signal may be taken and doubled in frequency, rather than tripled, to provide a suitable additional beam-control signal of the desired frequency $3 f_t$.

Figure 3A:
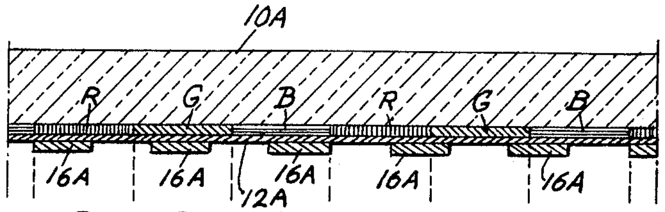
FIG. 3A is a diagrammatic sectional view of a portion of another form of screen means of a color television cathode-ray tube, to which the invention is applicable.
Figure 3B:
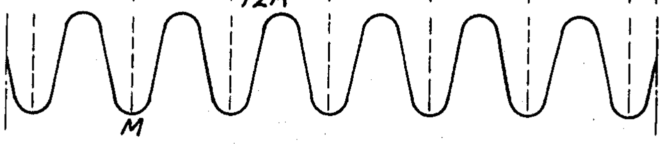
FIG. 3B is a graphical illustration of a waveform suitable for use as the additional signal of the invention, showing its preferred time relationship to the scanning of the screen means of FIG. 3A.

Referring now to FIGS. 3A and 3B, the screen structure of 3A differs from that in FIG. 1A in that each of the red, green and blue phosphor stripes has been extended to fill the following space 14 of FIG. 1A, so that the phosphor stripes are contiguous each other. Certain parts shown in FIG. 3A which correspond to parts shown in FIG. 1A are designated by the same numeral with the suffix A.

The beam-intensity varying signal shown in FIG. 3B is of the same frequency as that shown in FIG. 1B, but its minima points, for which the signal produces its maximum decrease in beam intensity, is now aligned with the boundary line between the contiguous phosphor stripes, as shown at M of FIG. 3B, for example. The beam therefore experiences a very substantial reduction in intensity when scanning across and near the boundary between successive phosphor stripes, so that the effects of phosphor cross-contamination and electrical cross talk are greatly reduced. This is particularly helpful when reproducing complementary colors, for which a pair of adjacent phosphor stripes are both to be strongly actuated by the beam.

Likewise, if the phosphor stripes are slightly in error in width or slightly displaced laterally relative to their proper locations with respect to the index stripes, the signal on line 490 can still be properly phased with respect to the chroma signal going into the other input terminal of adder 406 of FIG. 2, and if the signal on line 490 is large enough to cause appreciable modulation (preferably cut-off) of the cathode-ray beam current, the tube itself will act as a gate to cause rounded pulses of beam current to impinge on each phosphor stripe. These pulses have the proper relative strengths, even though they may be displaced from the centers of the color stripes due to the assumed positional error in the color stripe locations, relative to the index locations. But the slight misplacement of where on the color stripe the beam reaches its peak intensity no longer causes as much color error to the eye, and in fact would cause no color error to the eye at all under certain drive conditions, such as when the duration of the beam pulse is shortened, through increase of amplitude of the wave on line 490, to the point where the beam is off when it begins to laterally overlap the position of the color stripe and is again turned off before it scans beyond the same color stripe.

This operation provides, in effect, a time guard-band between excitation of adjacent stripes to permit some degree of mis-registry of time of the beam energy pulse without producing significant error in color rendition.

While the invention has been described with particular reference to specific embodiments thereof in the interest of a complete definiteness, it will be understood that it can be embodied in a variety of forms diverse from those specifically shown and described without departing from the spirit and scope of the invention, as defined by the appended claims.

What is claimed is:

1. In a television image-display system comprising, a cathode-ray tube including image-forming screen means, means for forming a cathode-ray beam in said tube and for scanning it across said screen means, and means responsive to an applied signal for controlling the intensity of said scanning beam to form an image on said screen means, said screen means comprising a plurality of similar groups of controllable light-influencing elements disposed across said screen means, adjacent elements in each of said groups responding to impingement by said beam to present light of a corresponding different characteristic, at least one of said elements in each of said groups being separated from an adjacent element along the direction of said scanning by a region which produces negligible light at the viewed side of said screen means in response to impingement by said beam; and means for applying to said beam-intensity controlling means a television signal to form said image on said screen means:

the improvement comprising, means for generating an additional signal having a frequency substantially equal to the rate at which said elements are scanned by said beam and means for using said additional signal to reduce the intensity of said beam each time said beam is substantially centered midway between adjacent ones of said elements.

2. Apparatus in accordance with claim 1, comprising material substantially filling each of said regions, said material producing negligible light emission at the viewed side of said screen means in response to impingement by said beam.

3. Apparatus in accordance with claim 2, comprising a plurality of index elements positioned in predetermined geometric relation to said light-influencing elements so as to be impinged successively by said scanning beam to generate an index signal.

4. Apparatus in accordance with claim 3, in which each of said index elements is wider in the direction of said scanning than are said regions.

5. Apparatus in accordance with claim 4, in which the number of said index elements in a major portion of said screen is an odd integral multiple, greater than one, of 1/N times the number of said groups, where N is an even number smaller than said odd multiple.

6. In a color television image-display system, comprising a cathode-ray tube including image-forming screen means, means for forming a cathode-ray beam in said tube and for scanning it across said screen means, and means responsive to an applied signal for controlling the intensity of said scanning beam to form a color image on said screen means, said screen means comprising a plurality of similar triplets of light-emissive elements disposed across said screen means, adjacent elements in each of said triplets being responsive to impingement by said beam to produce light of a corresponding different color, each of said light-emissive elements being spaced from those on opposite sides thereof, the spaces between said light-emissive elements being occupied by material which produces negligible light emission at the viewed side of said screen means in response to impingement by said beam, the spaces between said elements being regularly positioned so as to be scanned by said beam at a predetermined frequency; and means for applying to said beam-intensity controlling means a color television signal to form said color image on said screen means:

the improvement comprising, means for applying to said beam-intensity controlling means an additional signal alternating at said frequency and having a phase such as to produce its maximum reductions in beam intensity when said beam is directed toward said material in said spaces.

7. Apparatus in accordance with claim 6, in which each of said spaces is occupied by material which produces negligible light emission in response to impingement by said beam.

8. The apparatus of claim 6, in which said additional signal is substantially a sinusoid at three times the frequency of scanning of said triplets by said beam.

9. The apparatus of claim 8, comprising a plurality of index elements arranged in predetermined geometric configuration with respect to said triplets so to be impinged by said scanning beam, and responsive thereto to produce index signals representative of the position of said beam and having a frequency bearing a predetermined known ratio to the frequency at which said triplets are scanned by said beam, frequency conversion means responsive to said index signals for producing said additional signal, and phase-shifting means for providing said phase of said additional signal.

10. The apparatus of claim 9, in which said index elements are positioned toward the source of said beam with respect to said light-emissive elements, and are of greater width than said spaces in the direction of said scanning.

* * * * *